US 12,235,965 B2

(12) United States Patent
Harrison et al.

(10) Patent No.: US 12,235,965 B2
(45) Date of Patent: Feb. 25, 2025

(54) CONNECTION OF COMPUTERS OVER NETWORKS

(71) Applicant: Garrison Technology Ltd., London (GB)

(72) Inventors: Henry Harrison, London (GB); David Bailey, London (GB); Edward Frosztega, London (GB); Alison Warner, London (GB)

(73) Assignee: Garrison Technology Ltd., London (GB)

( * ) Notice: Subject to any disclaimer, the term of this patent is extended or adjusted under 35 U.S.C. 154(b) by 204 days.

(21) Appl. No.: 17/802,178

(22) PCT Filed: Feb. 25, 2021

(86) PCT No.: PCT/GB2021/050484
§ 371 (c)(1),
(2) Date: Aug. 25, 2022

(87) PCT Pub. No.: WO2021/171024
PCT Pub. Date: Sep. 2, 2021

(65) Prior Publication Data
US 2023/0359742 A1    Nov. 9, 2023

(30) Foreign Application Priority Data
Feb. 25, 2020  (GB) ................................. 2002650

(51) Int. Cl.
*G06F 21/57*   (2013.01)
*G06F 9/4401*  (2018.01)
*G06F 21/64*   (2013.01)
*G06F 21/53*   (2013.01)

(52) U.S. Cl.
CPC .......... *G06F 21/575* (2013.01); *G06F 9/4406* (2013.01); *G06F 9/4416* (2013.01); *G06F 21/57* (2013.01); *G06F 21/64* (2013.01); *G06F 21/53* (2013.01)

(58) Field of Classification Search
CPC .... G06F 21/575; G06F 9/4406; G06F 9/4416; G06F 21/57; G06F 21/64; G06F 21/53
See application file for complete search history.

(56) References Cited

U.S. PATENT DOCUMENTS

| | | | |
|---|---|---|---|
| 2013/0054948 A1* | 2/2013 | Raj ..................... | G06F 21/575 713/2 |
| 2015/0317471 A1 | 11/2015 | Baentsch et al. | |
| 2017/0180314 A1* | 6/2017 | Walker ................ | H04L 9/3263 |
| 2020/0184078 A1* | 6/2020 | Hinrichs ............. | H04L 9/3268 |

OTHER PUBLICATIONS

International Search Report, Mar. 21, 2021 (3 Pages).

* cited by examiner

*Primary Examiner* — Cheng-Feng Huang
(74) *Attorney, Agent, or Firm* — Occhiuti & Rohlicek LLP (57) ABSTRACT

A process performed at a first computer system for establishing a connection over a network between a second computer system and a logic block of the first computer system, comprises: providing an attestation from the first computer system to the second computer system that the logic block of the first computer system has not previously established a connection over the network with any computer system since the most recent power-up or reset of the logic block.

31 Claims, 6 Drawing Sheets

CONNECTION OF COMPUTERS OVER NETWORKS

CROSS REFERENCE TO RELATED APPLICATIONS

This application is a U.S. national stage application of International Application no. PCT/GB2021/050484, filed Feb. 25, 2021, which claims the benefit of the filing date of Great Britain Application No. 2002650.6, filed Feb. 25, 2020, the contents of which are hereby incorporated by reference in their entirety.

TECHNICAL FIELD

This disclosure relates to a the general field of computer security and particularly to the connection of one computer to another over a network.

BACKGROUND

Malicious software is a continuing problem for all computer systems.

When computer systems are connected to networks such as the internet, malware can spread rapidly over the network. Connecting a first computer system to a second computer system over a network therefore represents a risk that malware from one of the computers might infect the other.

SUMMARY

The techniques of this disclosure may generally concern a first computer providing an 'attestation' to a second computer. The second computer may be attempting to establish a connection with the first computer and may make a security decision based on the attestation or its absence, such as a decision whether to proceed with or abandon the connection with the first computer.

According to a first aspect of this disclosure there is provided a first computer system comprising: i) a logic block that includes one or more processing units that execute instructions; ii) a first network interface; and iii) a controller component. The logic block is configured to connect to a second computer system over a first network via the first network interface. The controller component is separate from the logic block and is configured to monitor power-up and reset of the logic block. The first computer system is configured to provide an attestation for the second computer system that the logic block of the first computer system has not previously established a connection via the first network interface with any computer system since the most recent power-up or reset of the logic block.

Preferably, the first computer system is configured to provide the attestation during establishment of a connection between the logic block and a second computer system via the first network interface. By providing this attestation to a second computer system during the establishment of a connection between the logic block and the second computer system, the second computer system can have confidence that the logic block is in a freshly booted state according to its boot instructions.

Preferably the first computer system and its logic block constitute a secure-boot computer system that only boots from trusted boot instructions. In some embodiments this may be achieved via a secure-boot technology such as a trusted execution environment, of which one example is ARM TrustZone. The logic block may be configured to boot only from boot instructions received from the controller component, wherein the logic block is configured to request boot instructions from the controller component of the first computer system on power-up or reset of the logic block, wherein the controller component is configured to communicate with the logic block and provide boot instructions to the logic block on power-up or reset of the logic block, wherein the boot instructions cannot be modified by the logic block. In such embodiments the second computer system can have confidence that the logic block is in a known good state, i.e. that it does not have malicious software running on the logic block.

This provides advantages to operators of computer networks, whereby the second computer system in this scenario is in a secure network and the operators of the secure network do not want to introduce malicious software into the secure network by connecting to other computer systems such as the first computer system in this scenario. Without the attestation, the second computer system cannot be sure that any previous access to the logic block of the first computer system by another computer system has not left the logic block in an unsafe state, such as having malicious software running on the logic block. But with the attestation the second computer system can be confident that no computer system has connected to the logic block and potentially left the logic block in an unsafe state.

With the attestation the second computer system can make the decision to either i) proceed with connecting to the logic block of the first computer system if it is attested that the logic block has not previously been connected via the first network interface with any computer system since the most recent power-up or reset of the logic block, i.e. that it is in a known good state, or ii) abandon the attempt to connect to the logic block if it cannot be attested that the logic block has not previously been connected via the first network interface with any computer system since the most recent power-up or reset of the logic block. The second computer system might still decide to connect to the logic block even if the attestation is not provided but in that case the responsibility for any effect of connecting to the potentially unsafe logic block might lie with the second computer system.

Even if the first computer system and its logic block do not constitute a secure-boot computer system, such an attestation may still provide advantages compared with computer systems that do not provide such an attestation. Any party connecting to such a computer system can still have a degree of confidence of the security of the computer system because non-persistent malware should have been cleared by the logic block's most recent boot, even if there remains a risk that persistent malware might remain on the logic block.

In a preferred embodiment, a connection between the logic block of the first computer system and a second computer system includes a cryptographic characteristic. The cryptographic characteristic may be that the establishment of the connection includes a cryptographic handshake and/or a cryptographic authentication step by which the logic block identifies itself to the second computer system. The first computer system may be configured to provide the attestation that the logic block of the first computer system has not previously established a connection via the first network interface with any computer system since the most recent power-up or reset of the logic block by the controller component providing a cryptographic functionality to the logic block only once after each power-up or reset of the logic block. By providing the cryptographic functionality to the logic block only once after each power-up or reset of the logic block, the logic block is only able to meet the cryptographic requirements of the connection once after each power-up or reset. At a subsequent attempt by a computer system to connect to the logic block via the first network interface the logic block would not be able to meet the cryptographic requirements of the connection, which would signal to the computer system attempting to connect that the logic block is in a potentially unsafe state.

Preferably the controller component is configured to provide a cryptographic functionality to the logic block only once after each power-up or reset of the logic block by demonstrating access to a secret key associated with the logic block only once after each power-up or reset of the logic block, wherein the logic block itself does not have access to the secret key associated with the logic block and the controller component is configured not to provide the secret key associated with the logic block to the logic block. A secret key may be associated with the logic block. The first computer system may store or have access to the secret key but the logic block does not have access to the secret key.

Preferably the cryptographic characteristic of the connection between the logic block of the first computer system and the second computer system includes a cryptographic handshake. Advantageously, the cryptographic functionality that provides the attestation can be part of a handshake that can take place early in the process of establishing the connection between second compute system and the logic block of the first computer system. By providing the attestation at an early stage in the process, security is further improved because a potentially compromised logic block of the first computer system has even less opportunity to compromise the second computer system.

Preferably demonstrating access to the secret key associated with the logic block comprises performing a cryptographic signature process using the secret key. The cryptographic signature process may be performed during a handshaking or authentication process during the establishing of the connection between the logic block and the second computer system.

In some embodiments the connection between the logic block of the first computer system and the second computer system additionally includes encryption of traffic over the connection.

In some embodiments the controller component comprises an interface manager that is connected to both the logic block and the first network interface, and communications between the logic block and the second computer system pass through the interface manager of the controller component. In such cases the controller component may be configured to perform a cryptographic signature process by digitally signing a message using the secret key and communicating the digitally signed message to the second computer system via the first network interface without sharing the secret key with the logic block. In particular, a cryptographic handshake may be performed between the second computer system and the interface manager, which forms part of the controller component. The controller component only completes the cryptographic handshake if it knows that the logic block is in a guaranteed clean state, i.e. by carrying out only one cryptographic handshake for the logic block per boot of the logic block. Another cryptographic operation may be performed using the secret key as an alternative to or in addition to the cryptographic handshake presented as an example, such as a cryptographic authentication step or the encryption of traffic.

In other embodiments the cryptographic handshake is performed between the second computer system and the logic block itself. The logic block may be connected to the first network interface with communications between the logic block and the second computer system passing from the first network interface to the logic block. Preferably the controller component is configured to perform a cryptographic signature process by digitally signing a message using the secret key and communicating the digitally signed message to the logic block for transmission to the second computer system without sharing the secret key with the logic block. In the case of a cryptographic handshake, the logic block may request, at an early stage of the handshake, that the controller component provide a cryptographic signature using a private key which is stored inside the controller component and is never supplied to the logic block. The controller component only provides the cryptographic signature if it knows that the logic block is in a guaranteed clean state, i.e. by providing a cryptographic signature for the logic block only once per boot of the logic block. Another cryptographic operation may be performed using the secret key as an alternative to or in addition to the cryptographic handshake presented as an example, such as a cryptographic authentication step or the encryption of traffic It is potentially more secure for an interface manager that is part of the controller component to perform a cryptographic handshake (or other cryptographic operation) with the second computer system than for the logic block itself to perform a cryptographic handshake or other cryptographic operation with the second computer system. This is because the second computer system could initiate a cryptographic handshake (or other cryptographic operation) with a compromised logic block. But the risk of this is controllable by deciding where in the cryptographic handshake (or other) process the controller signature is required. The earlier in the handshake (or other) process the controller signature is required, the lower the risk from a potentially compromised logic block. But by requiring an interface manager that is part of the controller component to perform the cryptographic handshake (or other cryptographic operation), the controller component is required to contain all of the logic needed to perform the cryptographic handshake (or other cryptographic operation). To include this additional logic the controller component may need to be more complex. An increase in complexity of the controller component might either increase the risk of vulnerabilities in the controller component or be more difficult and expensive to implement in a secure fashion.

In some embodiments the functions and steps of a cryptographic operation are performed by the controller component and the logic block in combination, with the functions and steps shared between the controller component.

In some embodiments the first computer system comprises a plurality of logic blocks and the controller component includes a plurality of interface managers that are each connected to a respective logic block. This may provide efficiencies if the overhead of the controller component can be shared between multiple logic blocks. Each interface manager of the controller component may be connected to the first network interface or, if the first computer system comprises a plurality of first network interfaces, each first network interface of the plurality of first network interfaces may be connected to a respective interface manager of the controller component, or alternatively one or more first network interfaces may be shared between the plurality of interface managers of the controller component.

In some embodiments the first computer system comprises a plurality of logic blocks and a plurality of first network interfaces, each logic block connected to a respective first network interface. In some other embodiments the first computer system comprises a plurality of logic blocks and a single first network interface, each of the plurality of logic blocks connected to the single first network interface. In some other embodiments, one or more first network interfaces are shared between a plurality of logic blocks.

In embodiments in which the first computer system includes a plurality of logic blocks as described above, the controller component can include a plurality of secret keys, each associated with a respective logic block of the plurality of logic blocks for use only with that logic block, or can include one or more secret keys each associated with more than one logic block. For example the controller component can include a single secret key associated with each logic block in the first computer system.

In some embodiments the controller component includes a life-cycle manager configured to determine whether to perform operations including one or more of: power-up, power-down and reset the logic block. This allows the controller to boot the logic block and thus remove some or all of any malware from the logic block. In the case of a secure-boot computer system, booting the logic block may place it into a known good state; otherwise booting may still ensure that only malware employing persistence techniques could remain.

In some embodiments the first computer system further comprises a second network interface connected to the controller component, wherein the controller component is configured to connect to a third computer system via the second network interface and receive boot instructions from the third computer system and to provide the boot instructions to the logic block, wherein the boot instructions are preferably stored in the controller and cannot be modified by software operating on the first computer system. This advantageously allows the operator of the first computer system to change the boot instructions for the logic block without needing physical access to the first computer system. The boot instructions might include an operating system. The boot instructions may be stored in read-only memory, ROM, programmable ROM, PROM, or erasable programmable ROM, EPROM. Alternatively the boot instructions may be stored in random access memory, RAM.

Preferably the controller component is a higher assurance component than the logic block. In some embodiments, the controller component may include a processor on which software runs, with the controller component's functionality provided as a result of the software running on the processor. To meet the higher assurance requirements the software of the controller component may developed using formal methods. In some embodiments the controller component may comprise a field programmable gate array (FPGA) or application specific integrated circuit (ASIC) that do not run software per se but instead may meet their higher assurance requirements by hardware design. If the higher assurance requirements are not enforced on the logic block then the logic block can be implemented more simply and may have a higher flexibility than the controller component without incurring the costs or difficulties associated with high assurance methods. For example, the logic block may be capable of running arbitrary software such as software not developed using formal methods. The flexibility to run arbitrary software means that the logic block may become compromised by malicious software during use. But computers connecting to the logic block can rely on the attestation to have confidence that the logic block is in its clean boot state, which reduces the risk that the logic block is compromised.

According to a further aspect of this disclosure there is provided a system comprising the first computer system as described above and the second computer system.

According to a further aspect of this disclosure there is provided a process performed at a first computer system for establishing a connection, which may be a communications channel, over a network between a second computer system and a logic block of the first computer system. The process comprises providing an attestation from the first computer system to the second computer system that the logic block of the first computer system has not previously established a communications channel over the network with any computer system since the most recent power-up or reset of the logic block.

According to a further aspect of this disclosure there is provided a first computer system configured to perform a process for establishing a connection over a network between a second computer system and a logic block of the first computer system, the first computer system comprising: means for providing, during the establishing of the connection, an attestation from the first computer system to the second computer system that the logic block of the first computer system has not previously established a connection over the network with any computer system since the most recent power-up or reset of the logic block.

In aspects and embodiments according to this disclosure, the logic block is preferably restricted in that either it does not connect or it cannot connect to an external device such as a remote computer (i.e. the second computer system in context of the discussion presented above) without providing an attestation (or in some embodiments without at least attempting to provide an attestation). Otherwise there is a risk that security measures may be bypassed by computers connecting to the logic block in a manner that does not require the attestation to be provided, which may compromise the logic block.

For example, where the attestation relates to the provision of a cryptographic functionality by a controller component of the first computer system, the logic block is restricted from connecting to external devices without employing the cryptographic functionality, preferably at the beginning of a connection such as in a cryptographic handshake. In some embodiments, this may be implemented through logical hardwiring of the logic block and/or other components of the first computer system. In other embodiments this may be implemented by software running on the logic block, such as software running on the logic block as a result of the boot instructions; i.e. the boot instructions may cause software to run on the logic block that enforces a restriction on external communications with external devices until a cryptographic functionality is provided. The cryptographic functionality involves obtaining a 'clean boot' attestation, i.e. that the logic block of the first computer system has not previously established a connection via the first network interface with any computer system since the most recent power-up or reset of the logic block and so the logic block is in its clean boot state.

For example, where the cryptographic functionality is or includes a cryptographic handshake, the logic block may be configured to have no external communications with an external device until a cryptographic handshake that involves obtaining/providing a clean boot attestation has taken place.

By these features, any remote computer connecting to the logic block and seeking to rely on the attestation can be confident that no other system or device has connected to the logic block prior to the attestation.

The boot instructions by which the logic block is booted are preferably configured to restrict the logic block from connecting to a second computer system via the first network interface without a cryptographic handshake taking place with the second computer system by which the controller component demonstrates access to the secret key associated with the logic block.

Furthermore, in aspects and embodiments according to this disclosure the logic block may further or alternatively be restricted to only accept traffic that has been cryptographically authenticated using keys exchanged during a cryptographic handshake. This may prevent communications from parties other than the external device with which the cryptographic handshake has taken place being processed by the logic block and potentially compromising the logic block while it is connected to the external device with which the cryptographic handshake has taken place.

By these features, any remote computer connecting to the logic block and seeking to rely on the clean boot attestation can be confident that no other system or device is communicating with the logic block after the clean boot attestation.

The boot instructions are preferably configured to, following the establishing of the connection with the second computer system, restrict the logic block from accepting traffic via the first network interface that is not authenticated by the second computer system using the one or more keys exchanged between the logic block and the second computer system during or following the cryptographic handshake. A corresponding restriction may apply at the second computer system. For example, a logic block of the second computer system may be, following the establishing of the connection with the first computer system, restricted from accepting traffic that is not authenticated by the first computer system using the one or more keys exchanged between the second computer system and the logic block of the first computer system during or following the cryptographic handshake.

The techniques of this disclosure may be implemented without using a secure-boot computer system. Such implementations may be less secure than those using a secure-boot computer system but may still provide improved security compared with computer systems that do not implement the techniques of this disclosure. For example, the rebooting of a logic block that does have secure-boot capabilities may mean that malware configured to persist after a logic block is logic block is rebooted such as by modifying the logic block's boot instructions may still persist in the rebooted logic block. But other malware might still be cleared from the logic block by the rebooting of the logic block. An attestation that the logic block has not previously established a connection with any computer system since the most recent power-up or reset of the logic block may still be useful for computers connecting to the logic block because it indicates that at least some types of malware do not exist on the logic block, even if there remains a risk of malware employing persistence techniques continuing to exist on the logic block.

Alternatively the techniques of this disclosure may be implemented in a 'measured-boot' computer system, by which elements of the boot procedure are checked ('measured') and information relating to the checks is be stored in a trusted platform module. The computer then makes available a log that can be tested to verify a boot state of the machine.

Alternatively the techniques of this disclosure may be implemented in secure-boot computer systems such as a computer system which boots from Read Only Memory (ROM). In practice the ROM may be erasable ROM (EROM), or programmable ROM (PROM) although in theory the ROM may comprise hardwired memory such as a diode matrix or mask ROM. In such cases it may be necessary to modify or replace the hardwired memory n order to update the boot instructions. In such secure-boot computer systems, software running on the logic block may be incapable of modifying the boot instructions used by the logic block on reset or power-up. Booting from ROM-stored boot instructions that are known not to be infected by malware means that power-up or reset of the logic block reliably returns the logic block to a clean state. An attestation that the logic block has not previously established a connection with any computer system since the most recent power-up or reset of the logic block will in such cases provide even more assurance to computers connecting to the logic block because the power-up or reset of the logic block would clear the logic block of malware regardless of whether the malware employs persistence techniques.

Alternatively the techniques of this disclosure may be implemented using a secure boot computer system such as the secure-boot computer systems described in WO 2017/093533 A1, which is hereby incorporated by reference into the present disclosure in its entirety. The techniques of this disclosure may be implemented using any of the secure-boot computer systems as described in WO 2017/093533 A1 and/or as discussed below, or using secure-boot computer systems using only a single feature isolated from descriptions of such secure-boot computer systems, or using any combination of features isolated from descriptions of such secure-boot computer systems. The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The invention will be described in more detail by way of example with reference to the accompanying drawings, in which.

DETAILED DESCRIPTION

Figure 1:
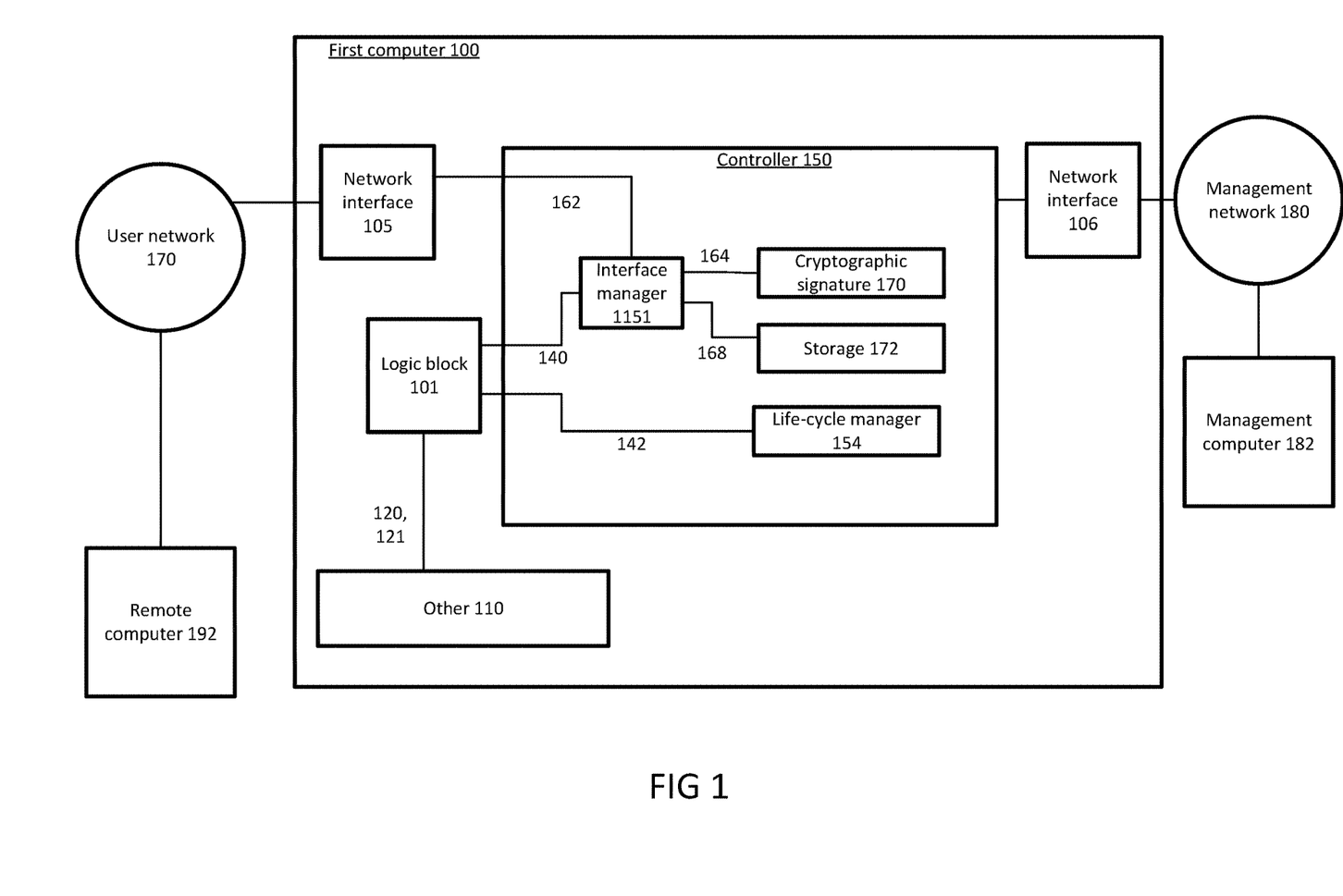
FIG. 1 is a further schematic diagram of a secure-boot computer system according to an embodiment of the invention.

FIG. 1 is a schematic diagram of a first computer system 100 that comprises a logic block 101, a controller 150 as well as other components 110. The first computer system 100 includes two network interfaces 105, 106, of which a first network interface 105 connects the first computer system 100 to a user network 190 and a second network interface 106 connects the first computer system 100 to a management network 180.

The controller 150 includes an interface manager 151, a life-cycle manager 154, a cryptographic signature module 170, and storage 172. The interface manager 151 of the controller 150 is connected to the logic block 101 via a first connection 140, to the first network interface 105 via a second connection 162, to the cryptographic signature module 170 via a third connection 164, and to the storage 172 via a fourth connection 168.

The logic block 101 is connected to the other components 110 of the first computer system 100 via one or more additional connections 120, 121.

A management computer system 182 is connected to the management network 180 and is able to update the controller 150 through the management network 180 to which the controller 150 is connected via the second network interface 106. Such updates include changes of functionality, updates to the contents of the storage 172 and provision of a cryptographic key to the controller 150.

The life-cycle manager 154 is able to reset or reboot the logic block 101 to return it to a 'known good' state. The controller 150 includes the on-board storage 172 from which the logic block 101 boots, the logic block 101 booting into a complete operating system based on boot instructions stored in the on-board storage 172.

A remote computer system 192 is connected to the user network 190 and can communicate with the logic block 101 of the first computer system 100 via the first network interface 105 of the first computer system. The logic block 101 is not connected directly to the first network interface 105. Communications between the logic block 101 and the first network interface 105, and from there to the user network 190 and any other computer system connected to the user network 190 such as the remote computer system 192, take place through the interface manager 151 of the controller 150 via the first connection 140, which couples the logic block 101 and the interface manager 151, and via the second connection 162, which couples the interface manager 151 and the first network interface 162.

The interface manager 151 within the controller 150 enforces a cryptographic characteristic on communication between the interface manager 151 and the remote computer system 192. The cryptographic characteristic may include cryptographic authentication between the remote computer system 192 and the first computer system 100, or may be encryption on traffic between the interface manager 151 and the remote computer system 192, or both. The cryptographic authentication may include performing steps of a challenge-handshake authentication protocol. The encryption on traffic between the interface manager 151 and the remote computer system 192 may include symmetric encryption or public key encryption or both, such as using public key encryption for to establish a shared secret key for later use in symmetric key encryption.

To set up the cryptographic characteristic of the communication, such as the cryptographic authentication, an initial cryptographic handshake takes place over the user network 190 between the remote computer system 192 and the interface manager 151. The cryptographic handshake includes an authentication process involving a secret key. The remote computer system 192 would only proceed with the handshake (and subsequent traffic exchanges) if the interface manager 151 is able to demonstrate that it can access the secret key, such as by using the secret key to carry out a cryptographic signature process. The logic block 101 does not have access to the secret key.

The controller 150 will only carry out the cryptographic signature process one time after each reset or reboot of the logic block 101 as initiated by the life-cycle manager 154. In order for the controller 150 to carry out the cryptographic signature process a further time, it is necessary for the logic block 101 to be reset or rebooted beforehand.

The cryptographic signature process may be performed by the cryptographic signature module 170 of the controller 150.

In this way, the remote computer system 192 can connect to the first computer system 100 and particularly the logic block 101 of the first computer system 100 with confidence that, provided the cryptographic signature process is performed correctly, then the first computer system 100 or its logic block 101 is in a clean state.

The remote computer system 192 would only proceed with the handshake (and subsequent traffic exchanges) if the interface manager 151 is able to demonstrate that it can access the secret key, such as by using the secret key to carry out a cryptographic signature process.

In some embodiments the controller 150 of the first computer system 100 does not include storage 172. In such examples the logic block 101 of the first computer system 100 can boot from other storage contained within the other components 110 of the first computer system 100 via the additional connections 120, 121. In other embodiments, while the controller 150 of the first computer system 100 does include storage 172, the logic block 101 of the first computer system nonetheless boots from other storage contained within the other components 110 of the first computer system 100.

In some embodiments the first computer system 100 generates a secret cryptographic key and provides the key to the remote computer system 192 through the management network 180 for later use in cryptographic communications with the logic block 101 via the first network interface 105. The secret cryptographic key may be generated by the controller 150 of the first computer system.

In some embodiments the first computer system 100 generates the private half of a public/private key pair and provides the public half to the remote computer system 192 via through the management network 180 for later use in cryptographic communications with the logic block 101 via the first network interface 105. The private key may be generated by the controller 150 of the first computer system 100.

In some embodiments, the boot instructions stored in the on-board storage 172 cause the logic block 101 to be unable to connect to any computer system (such as the remote computer system 192) via the first network interface 105 without performing a cryptographic handshake process, by which the controller 150 demonstrates access to the secret key by performing a cryptographic signing function. The controller 150 demonstrating access to the secret key is conditional on the logic block 101 of the first computer system 100 not having previously established a connection via the first network interface 105 with any computer system since the most recent power-up or reset of the logic block 101 and so the logic block 101 is in its clean boot state. When in its clean boot state, the logic block 101 cannot connect to any external computer system via the first network interface 105 without providing an attestation that triggers the controller 150 to demonstrate its access to the secret key, which is something that the controller 150 will not do again until the logic block 101 is next booted from its known clean boot instructions. The boot instructions further cause the logic block 101 to refuse to accept traffic via the first network interface 105 that is not authenticated using keys exchanged with the remote computer system 192 during the cryptographic handshake. This means that the remote computer system 192 can connect to the logic block 101 and, based on the clean boot attestation, be confident that the logic block 101 has not connected to any other computer over the first network interface 105 since its boot (if the logic block 101 had done so then it would have been necessary for the controller 150 to demonstrate access to the secret key as part of the attestation, which it would not be able to do a second time when the remote computer system 192 tries to connect to the logic block 101) and further be confident that no other computer system is connecting to the logic block 101 after the attestation and while the connection between the logic block 101 and the remote computer system 192 continues. Thus the remote computer system 192 can be confident that the logic block 101 is in its clean state at the time of the clean boot attestation at the beginning of the connection and further be confident that no other computer system has potentially caused the logic block 101 to be compromised after the attestation and while the connection continues.

Figure 2:
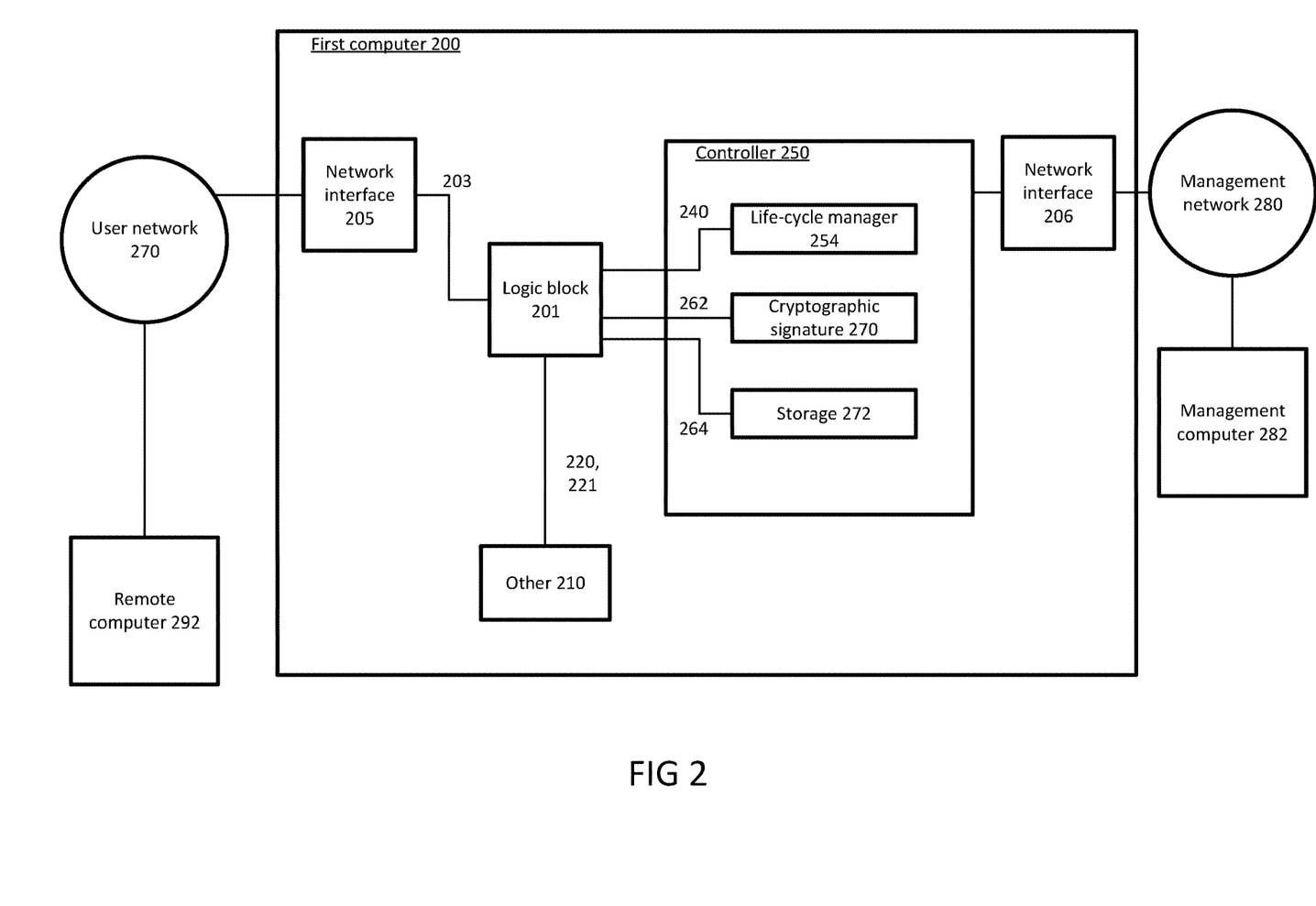
FIG. 2 is a further schematic diagram of a secure-boot computer system according to a further embodiment of the invention.

FIG. 2 is also a schematic diagram of a first computer system 200 that comprises a logic block 201, a controller 250 as well as other components 210. The first computer system 200 includes two network interfaces 205, 206, of which a first network interface 205 connects the first computer system 200 to a user network 190 and a second network interface 206 connects the first computer system to a management network 280.

However the system shown in FIG. 2 has some differences compared with the system shown in FIG. 1. In the system of FIG. 2 it is the logic block 201 itself that carries out a cryptographic process.

The controller 250 of the first computer system 100 shown in FIG. 2 includes a life-cycle manager 254, a cryptographic signature module 270, and storage 272. The logic block 201 is connected to the life-cycle manager 254 via a first connection 240, is connected to the cryptographic signature module 270 via a second connection 262, is connected to the storage 270 via a third connection 264. The logic block 201 is also connected to the first network interface 205 via a fourth connection 203 and is connected to the other components 210 of the first computer system 200 via one or more additional connections 220, 221.

A management computer system 282 is connected to the management network 280 and is able to update the controller 250 through the management network 280 to which the controller 250 is connected via the second network interface 206. Such updates include changes of functionality, updates to the contents of the storage 290 and provision of a cryptographic key to the controller 250.

The life-cycle manager 254 is able to reset or reboot the logic block 201 to return it to a 'known good' state. The controller 250 includes the on-board storage 280 from which the logic block 201 boots.

A remote computer system 292 is connected to the user network 290 and can communicate with the logic block 201 of the first computer system 200 via the first network interface 205 of the first computer system. In contrast with the system shown in FIG. 1, the system shown in FIG. 2 has the logic block 201 connected to the first network interface 205 without requiring all communications to pass through an interface manager of the controller 250. In this particular example the controller 250 does not include an interface manager to manage communications between the logic block 201 and the first network interface 205.

The logic block 201 cannot itself directly access the cryptographic signature module 270 of the controller 250. For communication between the logic block 201 and the remote computer system 292 to have a cryptographic characteristic, which may include wholly encrypted communication or a cryptographic authentication process at the start of a communication session, the logic block 201 must request a cryptographic process to be performed by the controller 250.

To set up the cryptographic characteristic of the communication, such as the cryptographic authentication, an initial cryptographic handshake takes place over the user network 290 between the remote computer system 292 and the logic block 201. The cryptographic handshake includes an authentication process involving a secret key. The remote computer system 292 would only proceed with the handshake (and subsequent traffic exchanges) if the logic block 201 is able to demonstrate to the remote computer system 292 that the controller 250 can access the secret key. This is demonstrated by the controller 250 performing a cryptographic signature process using the secret key without sharing the secret key itself. The controller 250 digitally signs a message using the secret key, which is a private key of a public/private key pair. The digitally signed message is passed to the logic block 201 which transmits it to the remote computer system 292 via the first network interface 205 and the user network 290.

If the remote computer system 292 has access to the public key that corresponds with the private key that is held secretly in the controller 250 of the first computer system 200 then it can perform a signature verifying process using the public key in combination with the message and digital signature received from the logic block 201 of the first computer system 200 and decide whether to accept or reject the message's claim to authenticity.

The controller 250 will only carry out the cryptographic signature process one time after each reset or reboot of the logic block 201 as initiated by the life-cycle manager 254. In order for the controller 250 to carry out the cryptographic signature process a further time, it is necessary for the logic block 201 to be reset or rebooted beforehand.

The cryptographic signature process may be performed by the cryptographic signature module 270 of the controller 250.

In this way, the remote computer system 292 can connect to the first computer system 200 and particularly the logic block 201 of the first computer system 200 with confidence that, provided the cryptographic signature process is performed correctly, then the first computer system 200 or its logic block 201 is in a clean state.

The remote computer system 292 would only proceed with the handshake (and subsequent traffic exchanges) if the interface manager 251 is able to demonstrate that it can access the secret key, such as by using the secret key to carry out a cryptographic signature process.

In some embodiments the controller 250 of the first computer system 200 does not include storage 272. In such examples the logic block 201 of the first computer system 200 can boot from other storage contained within the other components 210 of the first computer system 200 via the additional connections 220, 221. In other embodiments, while the controller 250 of the first computer system 200 does include storage 272, the logic block 201 of the first computer system nonetheless boots from other storage contained within the other components 210 of the first computer system 200.

In some embodiments the first computer system 200 generates a secret cryptographic key and provides the key to the remote computer system 292 through the management network 192 for later use in cryptographic communications with the logic block 201 via the first network interface 205. The secret cryptographic key may be generated by the controller 250 of the first computer system.

In some embodiments the first computer system 200 generates the private half of a public/private key pair and provides the public half to the remote computer system 292 via through the management network 280 for later use in cryptographic communications with the logic block 201. The private key may be generated by the controller 250 of the first computer system 200.

By having the first computer system's controller 150, 250 perform a cryptographic function using a secret key within the controller 150, 250, and to which the logic block 101, 201 has no access, the first computer system can attest that the logic block 101, 201 has not communicated with any remote computer system since booting. Where the first computer system is a secure boot computer system, this amounts to a clean system attestation. In other words, if the logic block 101, 201 of the first computer system is known to have booted securely, which may be ensured knowledge of secure boot features possessed by the first computer system, and is known to have not communicated with any other computer system over the user network 190, 290 since booting, which may be ensured by the techniques of this disclosure, then the remote computer system 192, 292 can provide confidence that the logic block 101, 201 is not running malicious software at the time of the connection of the remote computer system 192, 292 to the logic block 101, 201.

Figure 3:
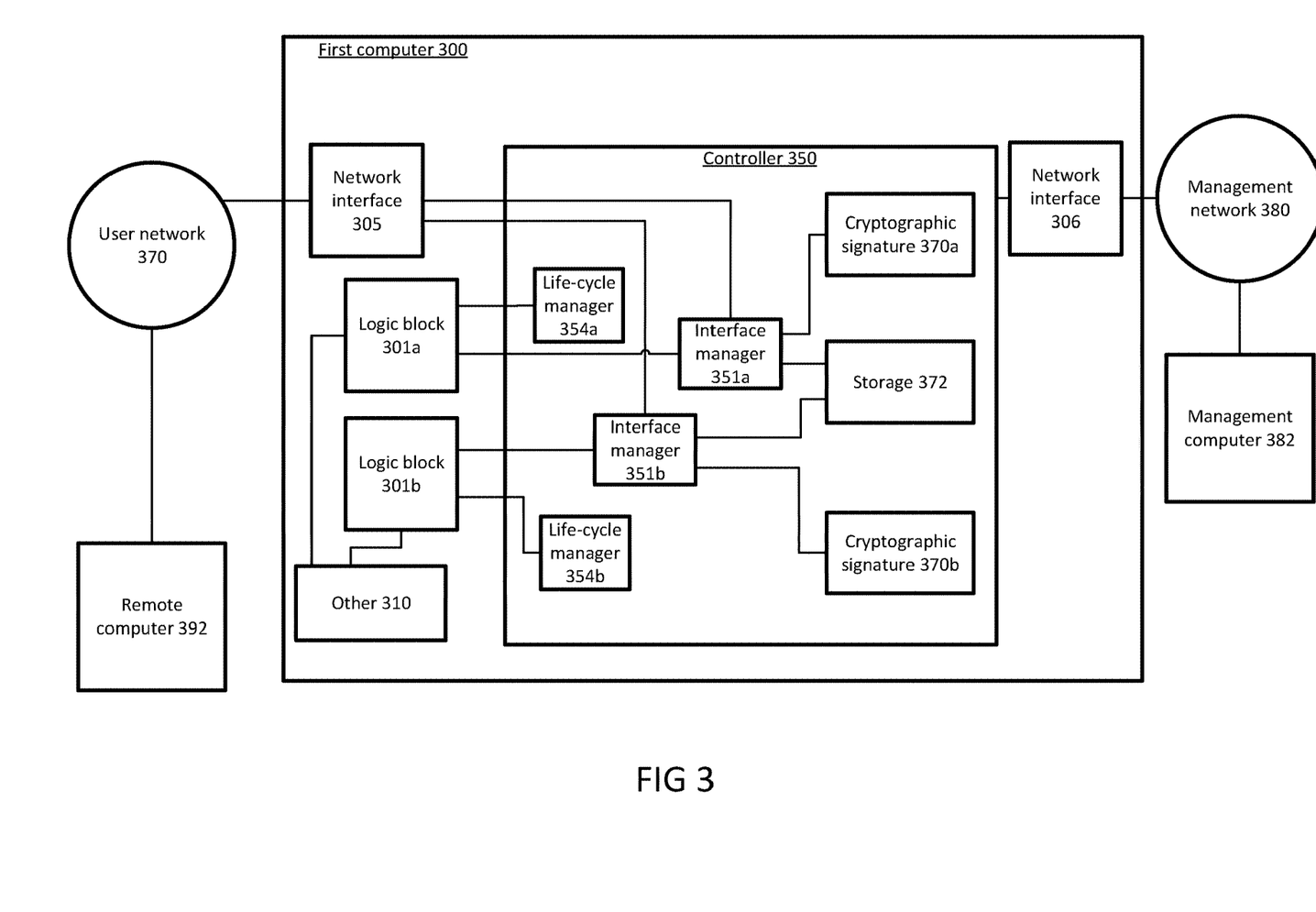
FIG. 3 is a further schematic diagram of a secure-boot computer system according to a further embodiment of the invention, in which the secure-boot computer system includes multiple logic blocks.

FIG. 3 shows a first computer system 300 that is a variant of the first computer system 100 shown in FIG. 1, wherein the first computer system 300 comprises a first logic block 301a, a second logic block 301b, a controller 350 as well as other components 310. The first computer system 300 includes two network interfaces 305, 306, of which a first network interface 305 connects the first computer system 300 to a user network 390 and a second network interface 306 connects the first computer system 300 to a management network 380.

The controller 350 includes first and second interface managers 351a, 351b, first and second life-cycle managers 354a, 354b, first and second cryptographic signature modules 370a, 370b, and storage 372. The first logic block 301a is connected to the first interface manager 351a, and is connected to the first life-cycle manager 354a. The first interface manager 351a is connected to the first network interface 305, to the first cryptographic signature module 370a, and to the storage 372. The second logic block 301b is connected to the second interface manager 351b, and is connected to the second life-cycle manager 354b. The second interface manager 351b is connected to the first network interface 305, to the second cryptographic signature module 370b, and to the storage 372. The first logic block 301a and the second logic block 301b are each connected to the other components 310.

A management computer system 382 is connected to the management network 380 and is able to update the controller 350 through the management network 380 to which the controller 350 is connected via the second network interface 106. Such updates include changes of functionality, updates to the contents of the storage 372 and provision of one or more cryptographic keys to the controller 350.

The first and second life-cycle managers 354a, 354b are able to reset or reboot their respective logic blocks 301a, 301b to return them to 'known good' states. The controller 350 includes the on-board storage 372 from which the logic blocks 301a, 301b boot.

A remote computer system 392 is connected to the user network 390 and can communicate with either of the logic blocks 301a, 301b of the first computer system 300 via the first network interface 305 of the first computer system. Neither logic block 301a, 301b is connected directly to the first network interface 305. Communications between either logic block 301 and the first network interface 305, and from there to the user network 390 and any other computer system connected to the user network 390 such as the remote computer system 392, take place through the interface manager 351a, 351b associated with each logic block 301a, 301b.

In some embodiments more than one remote computer system may connect to the first computer 300. For example, a first remote computer and a second remote computer may connect to the first and second logic blocks 301a, 301b respectively via the first and second interface managers 351a, 351b respectively.

While FIG. 3 shows the first computer system 300 to include two logic blocks 301a, 301b, in some embodiments the first computer system 300 may include more than two logic blocks, such as three, four, five, six, or any number of logic blocks. Including more logic blocks may permit a greater number of remote computer systems to be connected to a logic block in the first computer system 300 at the same time if each logic block is connected to a separate remote computer system. Alternatively more logic blocks may permit a single remote computer system to connect to more logic blocks of the first computer system 300 at the same time. In such embodiments the controller 350 may include an interface manager and cryptographic signature module and life-cycle manager for each logic block. In some embodiments at least a portion of the logic blocks share one or more of an interface manager, a cryptographic signature module and a life-cycle manager.

The controller 350 may include a secret key for each logic block 301a, 301b of the first computer system 300. Where the first computer system 300 includes more than two logic blocks, the controller 350 may include a secret key for each logic block of the first computer system 300.

Each interface manager 351a, 351b within the controller 350 enforces a cryptographic characteristic on communication between the interface manager 351a, 351b and any remote computer system 392. The cryptographic characteristic may include cryptographic authentication between the remote computer system 392 and the first computer system 300, or may be encryption on traffic between the interface manager 351a, 351b and the remote computer system 392, or both. The cryptographic authentication may include performing steps of a challenge-handshake authentication protocol. The encryption on traffic between the interface manager 351a, 351b and the remote computer system 392 may include symmetric encryption or public key encryption or both, such as using public key encryption for to establish a shared secret key for later use in symmetric key encryption.

To set up the cryptographic characteristic of the communication, such as the cryptographic authentication, an initial cryptographic handshake takes place over the user network 390 between the remote computer system 392 and the interface manager 351a, 351b. The cryptographic handshake includes an authentication process involving a secret key. The remote computer system 392 would only proceed with the handshake (and subsequent traffic exchanges) if the interface manager 351a, 351b is able to demonstrate that it (or rather that the controller 350) can access the secret key, such as by using the secret key to carry out a cryptographic signature process. Neither logic block 301a, 301b has access to the respective secret key.

The controller 350 will only carry out the cryptographic signature process for a logic block 301a, 301b one time after each reset or reboot of the respective logic block 301a, 301b as initiated by the respective life-cycle manager 354a, 354b. In order for the controller 350 to carry out the cryptographic signature process a further time for a logic block 301a, 301b, it is necessary for that logic block 301a, 301b to be reset or rebooted beforehand.

For each logic block 301a, 301b, the cryptographic signature process may be performed by the cryptographic signature module 370a, 370b of the controller 350 associated with the respective logic block 301a, 301b, using the secret key associated with the respective logic block 301a, 301b.

In this way, the remote computer system 392 can connect to the first computer system 300 and particularly one of the logic blocks 301a, 301b of the first computer system 300 with confidence that, provided the cryptographic signature process is performed correctly, then the logic block 301a, 301b is in a clean state. The remote computer system 392 can simultaneously connect to multiple logic blocks 301a, 301b with confidence that each logic block 301a, 301b is a clean state. Alternatively or additionally, multiple remote computer systems can each connect to one or more logic blocks of the first computer system with confidence that each logic block is in a clean state, and maintain connections with each of the respective one or more logic blocks with such confidence.

In some embodiments the first computer system 300 generates a public/private key pair for each logic block 301a, 301b, and provides one or both public keys to the remote computer system 392 via through the management network 380 for later use in cryptographic communications with one or both logic blocks 301a, 301b via the first network interface 305. The private keys may be generated by the controller 350 of the first computer system 300 and retained as secret keys for use in cryptographic operations.

Figure 4:
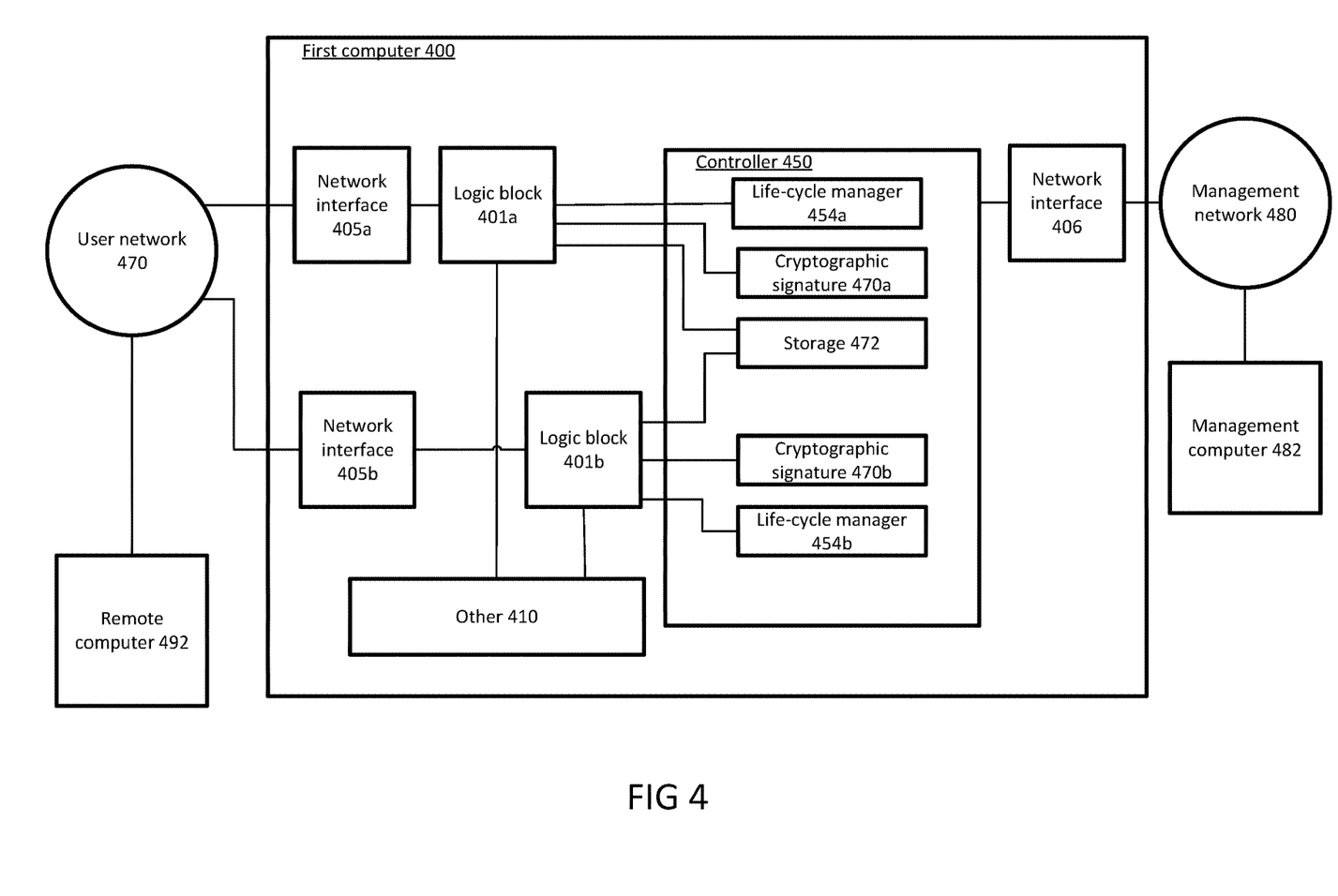
FIG. 4 is a further schematic diagram of a secure-boot computer system according to a further embodiment of the invention, in which the secure-boot computer system includes multiple logic blocks.

FIG. 4 shows a first computer system 400 that is a variant of the first computer system 200 shown in FIG. 2, wherein the first computer system 400 comprises a first logic block 401a, a second logic block 401b, a controller 450 as well as other components 410. The first computer system 400 includes multiple network interfaces 405a, 405b, 406. Each logic block 401a, 401b is connected to respective one of two 'first' network interfaces 405a, 405b, for connecting to a user network 470. A second network interface 406 connects the first computer system 400 to a management network 480.

The controller 450 includes first and second life-cycle managers 454a, 454b, first and second cryptographic signature modules 470a, 470b, and storage 472. In addition to a first one 405a of the two 'first' network interfaces 405a, 405b, the first logic block 401a is connected to the first life-cycle manager 454a, to the first cryptographic signature module 470a, and to the storage 472. In addition to a second one 405b of the two 'first' network interfaces 405a, 405b, the second logic block 401b is connected to the second life-cycle manager 454b, to the second cryptographic signature module 470b, and to the storage 472. The first logic block 401a and the second logic block 401b are each connected to the other components 410.

A management computer system 482 is connected to the management network 480 and is able to update the controller 450 through the management network 480 to which the controller 450 is connected via the second network interface 106. Such updates include changes of functionality, updates to the contents of the storage 472 and provision of one or more cryptographic keys to the controller 450.

The first and second life-cycle managers 454a, 454b are able to reset or reboot their respective logic blocks 401a, 401b to return them to 'known good' states. The controller 450 includes the on-board storage 472 from which the logic blocks 401a, 401b boot.

A remote computer system 492 is connected to the user network 490 and can communicate with either of the logic blocks 401a, 401b of the first computer system 400 via the first network interface 405 of the first computer system.

In some embodiments more than one remote computer system may connect to the first computer 400. For example, a first remote computer and a second remote computer may connect to the first and second logic blocks 401a, 401b respectively.

While FIG. 4 shows the first computer system 400 to include two logic blocks 401a, 401b, in some embodiments the first computer system 400 may include more than two logic blocks, such as three, four, five, six, or any number of logic blocks. Including more logic blocks may permit a greater number of remote computer systems to be connected to a logic block in the first computer system 400 at the same time if each logic block is connected to a separate remote computer system. Alternatively more logic blocks may permit a single remote computer system to connect to more logic blocks of the first computer system 400 at the same time. In such embodiments the controller 450 may include a cryptographic signature module and life-cycle manager for each logic block. In some embodiments at least a portion of the logic blocks share one or more of a cryptographic signature module and a life-cycle manager.

The controller 450 may include a secret key for each logic block 401a, 401b of the first computer system 400. Where the first computer system 400 includes more than two logic blocks, the controller 450 may include a secret key for each logic block of the first computer system 400.

A cryptographic characteristic is enforced on communication between a logic block 401a, 401b and any remote computer system 492. The cryptographic characteristic may include cryptographic authentication between the remote computer system 492 and the first computer system 400 (or rather the respective logic block 401a, 401b), or may be encryption on traffic between the logic block 401a, 401b and the remote computer system 492, or both. The cryptographic authentication may include performing steps of a challenge-handshake authentication protocol. The encryption on traffic between the logic block 401a, 401b and the remote computer system 492 may include symmetric encryption or public key encryption or both, such as using public key encryption for to establish a shared secret key for later use in symmetric key encryption.

To set up the cryptographic characteristic of the communication, such as the cryptographic authentication, an initial cryptographic handshake takes place over the user network 490 between the remote computer system 492 and a logic block 401a, 401b. The cryptographic handshake includes an authentication process involving a secret key. The remote computer system 492 would only proceed with the handshake (and subsequent traffic exchanges) if the logic block 401*a*, 401*b* is able to demonstrate that the controller 450 can access the secret key associated with the logic block 401*a*, 401*b*, such as by using the secret key to carry out a cryptographic signature process. Neither logic block 401*a*, 401*b* has access to the secret key.

The controller 450 will only carry out the cryptographic signature process for a logic block 401*a*, 401*b* one time after each reset or reboot of the respective logic block 401*a*, 401*b* as initiated by the respective life-cycle manager 454*a*, 454*b*. In order for the controller 450 to carry out the cryptographic signature process a further time for a logic block 401*a*, 401*b*, it is necessary for that logic block 401*a*, 401*b* to be reset or rebooted beforehand.

For each logic block 401*a*, 401*b*, the cryptographic signature process may be performed by the cryptographic signature module 470*a*, 470*b* of the controller 450 associated with the respective logic block 401*a*, 401*b*, using the secret key associated with the respective logic block 401*a*, 401*b*.

In this way, the remote computer system 492 can connect to the first computer system 400 and particularly one of the logic blocks 401*a*, 401*b* of the first computer system 400 with confidence that, provided the cryptographic signature process is performed correctly, then the logic block 401*a*, 401*b* is in a clean state. The remote computer system 492 can simultaneously connect to multiple logic blocks 401*a*, 401*b* with confidence that each logic block 401*a*, 401*b* is a clean state. Alternatively or additionally, multiple remote computer systems can each connect to one or more logic blocks of the first computer system with confidence that each logic block is in a clean state, and maintain connections with each of the respective one or more logic blocks with such confidence.

In some embodiments the first computer system 400 generates a public/private key pair for each logic block 401*a*, 401*b*, and provides one or both public keys to the remote computer system 492 via through the management network 480 for later use in cryptographic communications with one or both logic blocks 401*a*, 401*b* via the first network interface 405. The private keys may be generated by the controller 450 of the first computer system 400 and retained as secret keys for use in cryptographic operations.

Figure 5:
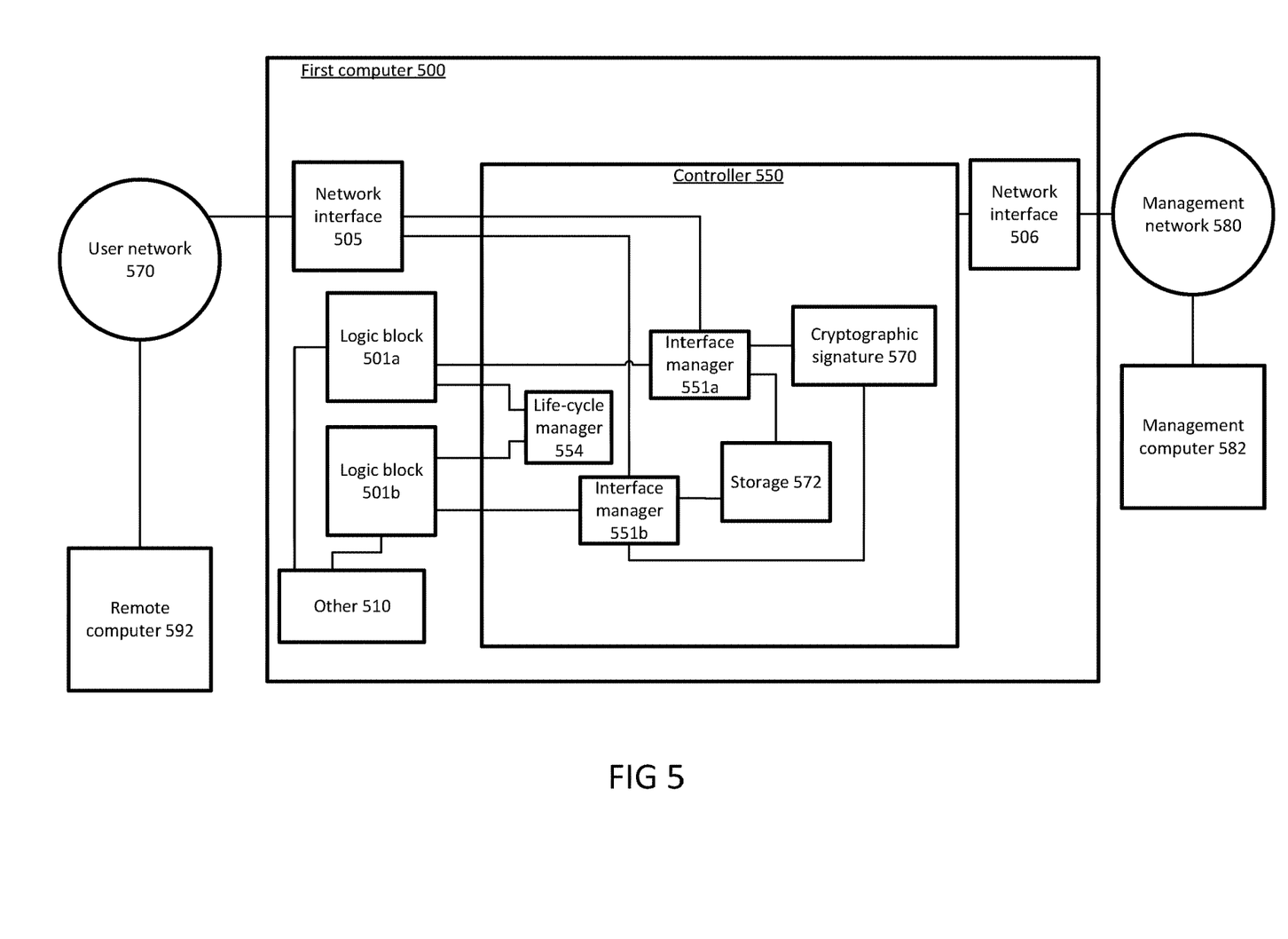
FIG. 5 is a further schematic diagram of a secure-boot computer system according to a further embodiment of the invention, in which the secure-boot computer system includes multiple logic blocks.

FIG. 5 shows a first computer system 500 that is a variant of the first computer system 300 shown in FIG. 3, wherein the first computer system 500 comprises a first logic block 501*a*, a second logic block 501*b*, a controller 550 as well as other components 510. The first computer system 500 includes two network interfaces 505, 506, of which a first network interface 505 connects the first computer system 500 to a user network 590 (and from there to a remote computer 592) and a second network interface 506 connects the first computer system 500 to a management network 580 (and from there to a management computer 582).

Unlike the system shown in FIG. 3, the controller 350 includes first and second interface managers 551*a*, 551*b*. The first logic block 501*a* is connected to the first interface manager 551*a* and the second logic block 501*b* is connected to the second interface manager 551*b*. Both first and second logic blocks 501*a*, 501*b* are connected to a single life-cycle manager 554. Both first and second interface managers 551*a*, 551*b* are connected to a single cryptographic signature module 570. The first logic block 501*a* and the second logic block 501*b* are each connected to the other components 510.

The functionality of the first computer system 500 of FIG. 5 is broadly the same as that of FIG. 3, but the single life-cycle manager 554 is able to (independently or jointly) reset or reboot both logic blocks 501*a*, 501*b* to return them to 'known good' states.

Communications between either logic block 501*a*, 501*b* and the first network interface 505, and from there to the user network 590 and any other computer system connected to the user network 390 such as the remote computer system 592, take place through the interface manager 551*a*, 551*b* associated with each logic block 501*a*, 501*b*.

Each interface manager 551*a*, 551*b* within the controller 550 enforces a cryptographic characteristic on communication between the interface manager 551*a*, 551*b* and any remote computer system 592. The cryptographic characteristic may include cryptographic authentication between the remote computer system 592 and the first computer system 500, or may be encryption on traffic between the interface manager 551*a*, 551*b* and the remote computer system 592, or both. The cryptographic authentication may include performing steps of a challenge-handshake authentication protocol. The encryption on traffic between the interface manager 551*a*, 551*b* and the remote computer system 592 may include symmetric encryption or public key encryption or both, such as using public key encryption for to establish a shared secret key for later use in symmetric key encryption.

To set up the cryptographic characteristic of the communication, such as the cryptographic authentication, an initial cryptographic handshake takes place over the user network 590 between the remote computer system 592 and the interface manager 551*a*, 551*b*. The cryptographic handshake includes an authentication process involving a secret key. The remote computer system 592 would only proceed with the handshake (and subsequent traffic exchanges) if the interface manager 551*a*, 551*b* is able to demonstrate that it (or rather that the controller 550) can access the secret key associated with a logic block 501*a*, 501*b*, such as by using the secret key to carry out a cryptographic signature process. Neither logic block 501*a*, 501*b* has access to the respective secret key.

The controller 550 will only carry out the cryptographic signature process for a logic block 501*a*, 501*b* one time after each reset or reboot of the respective logic block 501*a*, 501*b* as initiated by the respective life-cycle manager 554*a*, 554*b*. In order for the controller 550 to carry out the cryptographic signature process a further time for a logic block 501*a*, 501*b*, it is necessary for that logic block 501*a*, 501*b* to be reset or rebooted beforehand.

For each logic block 501*a*, 501*b*, the cryptographic signature process may be performed by the cryptographic signature module 570 of the controller 550 using the specific secret key associated with the respective logic block 501*a*, 501*b*.

Compared with the system of FIG. 3, the system of FIG. 5 shares various components of the controller between the logic blocks but does maintain a separate secret key for each of the logic blocks. In some embodiments a single interface manager is shared between multiple logic blocks.

Figure 6:
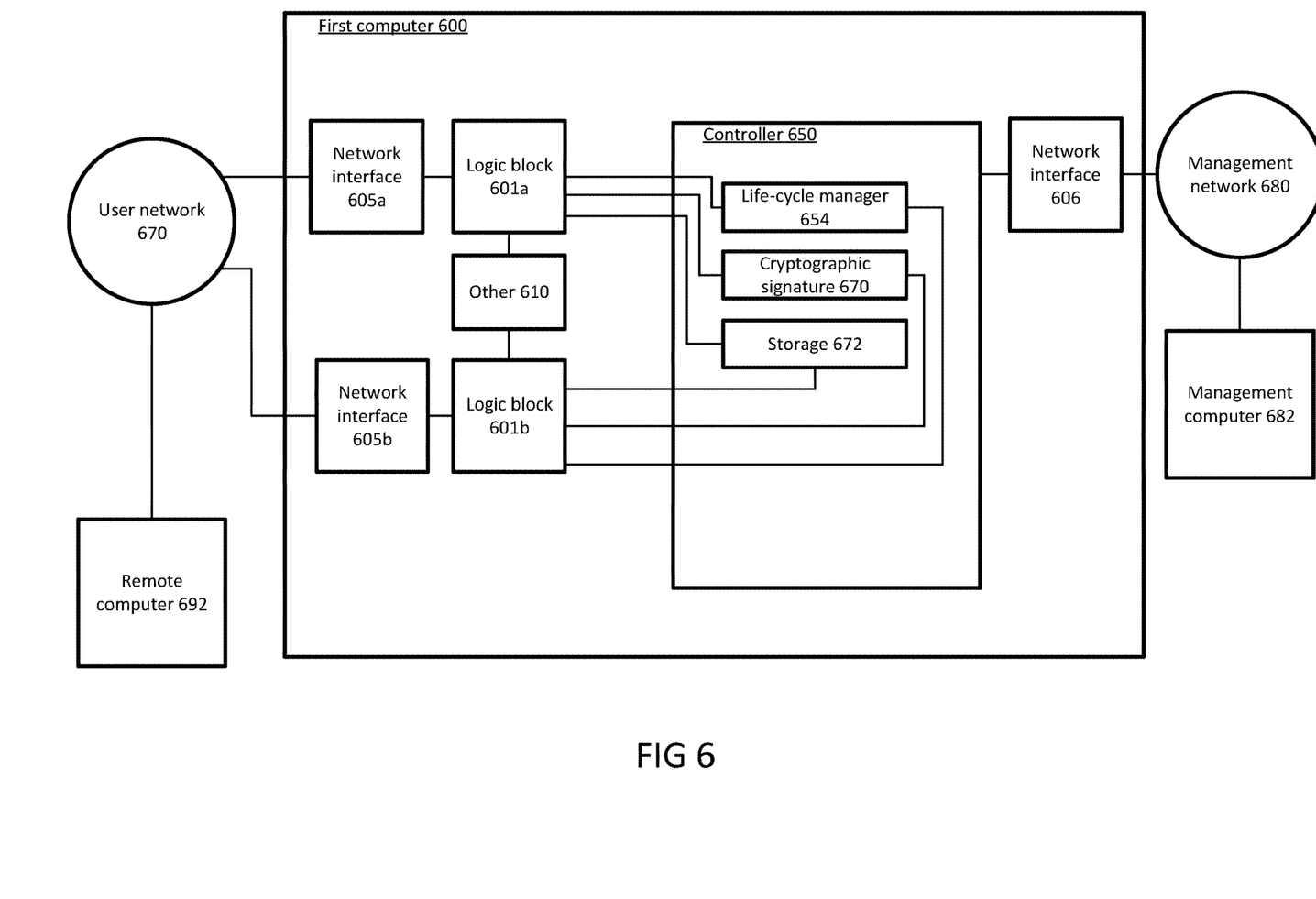
FIG. 6 is a further schematic diagram of a secure-boot computer system according to a further embodiment of the invention, in which the secure-boot computer system includes multiple logic blocks.

FIG. 5 shows a first computer system 600 that is a variant of the first computer system 400 shown in FIG. 4, wherein the first computer system 600 differs from that of FIG. 4 in that it includes a single life-cycle manager 654 and a single cryptographic signature module 670 shared between the first and second logic blocks 601*a*, 601*b*.

The first computer system 600 comprises a first logic block 601*a*, a second logic block 601*b*, a controller 650 as well as other components 610. The first computer system 600 includes multiple network interfaces 605*a*, 605*b*, 606. Each logic block 601*a*, 601*b* is connected to respective one of two 'first' network interfaces 605a, 605b, for connecting to a user network 670. A second network interface 606 connects the first computer system 600 to a management network 680.

The controller 650 includes a single life-cycle manager 654, a single cryptographic signature module 670, and storage 672. In addition to a first one 605a of the two 'first' network interfaces 605a, 605b, the first logic block 601a is connected to the life-cycle manager 654, to the cryptographic signature module 670, and to the storage 672. In addition to a second one 605b of the two 'first' network interfaces 605a, 605b, the second logic block 601b is connected to the life-cycle manager 654, to the cryptographic signature module 670, and to the storage 672. The first logic block 601a and the second logic block 601b are each connected to the other components 610.

A management computer system 682 is connected to the management network 680 and is able to update the controller 650 through the management network 680 to which the controller 650 is connected via the second network interface 106. Such updates include changes of functionality, updates to the contents of the storage 672 and provision of one or more cryptographic keys to the controller 650.

The life-cycle manager 654 is able to (independently or jointly) reset or reboot the first and second logic blocks 601a, 601b to return them to 'known good' states. The controller 650 includes the on-board storage 672 from which the logic blocks 601a, 601b boot.

A remote computer system 692 is connected to the user network 690 and can communicate with either of the logic blocks 601a, 601b of the first computer system 600 via the first network interface 605 of the first computer system.

In some embodiments more than one remote computer system may connect to the first computer 600. For example, a first remote computer and a second remote computer may connect to the first and second logic blocks 601a, 601b respectively.

While FIG. 4 shows the first computer system 600 to include two logic blocks 601a, 601b, in some embodiments the first computer system 600 may include more than two logic blocks, such as three, four, five, six, or any number of logic blocks.

The controller 650 may include a secret key for each logic block 601a, 601b of the first computer system 600. Where the first computer system 600 includes more than two logic blocks, the controller 650 may include a secret key for each logic block of the first computer system 600.

A cryptographic characteristic is enforced on communication between a logic block 601a, 601b and any remote computer system 692. The cryptographic characteristic may include cryptographic authentication between the remote computer system 692 and the first computer system 600 (or rather the respective logic block 601a, 601b), or may be encryption on traffic between the logic block 601a, 601b and the remote computer system 692, or both. The cryptographic authentication may include performing steps of a challenge-handshake authentication protocol. The encryption on traffic between the logic block 601a, 601b and the remote computer system 692 may include symmetric encryption or public key encryption or both, such as using public key encryption for to establish a shared secret key for later use in symmetric key encryption.

To set up the cryptographic characteristic of the communication, such as the cryptographic authentication, an initial cryptographic handshake takes place over the user network 690 between the remote computer system 692 and a logic block 601a, 601b. The cryptographic handshake includes an authentication process involving a secret key. The remote computer system 692 would only proceed with the handshake (and subsequent traffic exchanges) if the logic block 601a, 601b is able to demonstrate that the controller 650 can access the secret key associated with the logic block 601a, 601b, such as by using the secret key to carry out a cryptographic signature process. Neither logic block 601a, 601b has access to the secret key.

The controller 650 will only carry out the cryptographic signature process for a logic block 601a, 601b one time after each reset or reboot of the respective logic block 601a, 601b as initiated by the respective life-cycle manager 654a, 654b. In order for the controller 650 to carry out the cryptographic signature process a further time for a logic block 601a, 601b, it is necessary for that logic block 601a, 601b to be reset or rebooted beforehand.

For each logic block 601a, 601b, the cryptographic signature process may be performed by the cryptographic signature module 670, using the secret key associated with the respective logic block 601a, 601b.

In this way, the remote computer system 692 can connect to the first computer system 600 and particularly one of the logic blocks 601a, 601b of the first computer system 600 with confidence that, provided the cryptographic signature process is performed correctly, then the logic block 601a, 601b is in a clean state. The remote computer system 692 can simultaneously connect to multiple logic blocks 601a, 601b with confidence that each logic block 601a, 601b is a clean state. Alternatively or additionally, multiple remote computer systems can each connect to one or more logic blocks of the first computer system with confidence that each logic block is in a clean state, and maintain connections with each of the respective one or more logic blocks with such confidence.

In some embodiments the first computer system 600 generates a public/private key pair for each logic block 601a, 601b, and provides one or both public keys to the remote computer system 692 via through the management network 680 for later use in cryptographic communications with one or both logic blocks 601a, 601b via the first network interface 605. The private keys may be generated by the controller 650 of the first computer system 600 and retained as secret keys for use in cryptographic operations.

In some of the embodiments described above a life-cycle manager is included within the first computer system wherein the life-cycle manager controls the reset or power-up of a logic block. It may initiate or instruct the reset or power-up of the logic block. But in other embodiments the first computer system includes a life-cycle monitor that monitors the reset or power-up of the logic block without directly controlling or instructing the reset or power-up. In such embodiments the logic block may be reset or powered-up by other means but the life-cycle monitor may ensure that the controller provides the cryptographic functionality to the logic block only once after each reset or power-up of the logic block.

The skilled reader will recognize that the present disclosure attempts to describe explicitly various combinations of features in accordance with the aspects of this disclosure but the skilled person will recognize that an exhaustive description of every permutation and combination of features is not practical and that it is intended that the features described in the present disclosure may be combined in ways not explicitly described in this disclosure. This includes isolating features disclosed in the context of one embodiment and combining the feature with features of a different embodiment without including all of the features of the first embodiment. In the case of doubt as to the contents of this disclosure, such as whether a combination of features is ambiguously or unambiguously derivable from this disclosure, the skilled reader is to consider such combinations allowable and disclosed. This includes the features expressly described herein and features from the secure-boot computers described in WO 2017/093533 A1.

The skilled reader will appreciate that the various illustrative logical blocks, configurations, modules, circuits, and algorithm steps described in connection with the embodiments disclosed herein may be implemented as electronic hardware, computer system software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. The skilled reader may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in software executed by a processor, or in a combination of the two. If implemented in software, the functions may be stored on or transmitted over, as one or more instructions or code, a computer system-readable medium and executed by a hardware-based processing unit. Computer-readable media may include computer system-readable storage media, which corresponds to a tangible medium such as data storage media, or communication media including any medium that facilitates transfer of a computer system program from one place to another, e.g., according to a communication protocol. In this manner, computer system-readable media generally may correspond to tangible computer system-readable storage media which is non-transitory or alternatively to a communication medium such as a signal or carrier wave. Data storage media may be any available media that can be accessed by one or more computer systems or one or more processors to retrieve instructions, code and/or data structures for implementation of the techniques described in this disclosure.

In some embodiments the techniques of this disclosure are implemented using one or more examples of the computing device known as a system on a chip. This may be an integrated circuit that integrates all or many of the components of a computer system or other electronic system, including but not limited to a central processing unit (CPU), memory, input/output ports, and secondary storage, and contain digital, analogue, mixed-signal, RF signal processing functions or some combination thereof. Such embodiments may include or may be implemented wholly or partly using one or more field programmable gate array (FPGA) devices.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The invention claimed is:

1. A first computer system comprising:
a logic block that includes one or more hardware processing units that execute instructions;
a first network interface, wherein the logic block is configured to connect to a second computer system over a first network via the first network interface; and
a controller component that is separate from the logic block and is configured to monitor power-up and reset of the logic block,
wherein the first computer system is configured to provide an attestation for the second computer system that the logic block of the first computer system has not previously established a connection via the first network interface with any computer system since the most recent power-up or reset of the logic block.

2. The first computer system of claim 1, wherein the first computer system is configured to prevent the logic block from connecting to any computer system over the first network interface until the controller component has provided an attestation.

3. The first computer system of claim 1, wherein the first computer system is configured to provide the attestation during establishment of a connection between the logic block and a second computer system via the first network interface.

4. The first computer system of claim 1, wherein:
the connection between the logic block of the first computer system and a second computer system includes a cryptographic characteristic, and
the first computer system is configured to provide the attestation that the logic block of the first computer system has not previously established a connection via the first network interface with any computer system since the most recent power-up or reset of the logic block by the controller component providing a cryptographic functionality to the logic block only once after each power-up or reset of the logic block.

5. The first computer system of claim 4, wherein:
the controller component is configured to provide a cryptographic functionality to the logic block only once after each power-up or reset of the logic block by demonstrating access to a secret key associated with the logic block only once after each power-up or reset of the logic block, and
the logic block itself does not have access to the secret key associated with the logic block and the controller component is configured not to provide the secret key associated with the logic block to the logic block.

6. The first computer system of claim 5, wherein the cryptographic characteristic of the connection of between the logic block of the first computer system and the second computer system includes a cryptographic handshake.

7. The first computer system of claim 6, wherein the logic block is configured to boot from boot instructions that are configured to restrict the logic block from connecting to a second computer system via the first network interface without a cryptographic handshake taking place with the second computer system by which the controller component demonstrates access to the secret key associated with the logic block.

8. The first computer system of claim 7, wherein one or more keys are exchanged between the logic block and the second computer system during or following the cryptographic handshake and the boot instructions are configured to, following the establishing of the connection with the second computer system, restrict the logic block from accepting traffic via the first network interface that is not authenticated by the second computer system using the one or more keys.

9. The first computer system of claim 5, wherein demonstrating access to the secret key associated with the logic block comprises performing a cryptographic signature process using the secret key.

10. The first computer system of claim 9, wherein the cryptographic signature process is performed during a handshaking or authentication process at the establishing of a connection between the logic block and the second computer system.

11. The first computer system claim 5, wherein the cryptographic characteristic of the connection between the logic block of the first computer system and the second computer system includes encryption of traffic over the connection.

12. The first computer system of claim 5, wherein the controller component comprises an interface manager that is connected to both the logic block and the first network interface, and wherein communications between the logic block and the second computer system pass through the interface manager of the controller component.

13. The first computer system of claim 12, wherein the controller component is configured to perform a cryptographic signature process by digitally signing a message using the secret key and communicating the digitally signed message to the second computer system via the first network interface without sharing the secret key with the logic block.

14. The first computer system of claim 13, wherein the first computer system comprises a plurality of logic blocks and the controller component includes a plurality of interface managers that are each connected to a respective logic block.

15. The first computer system of claim 14, wherein each interface manager of the controller component is connected to the first network interface.

16. The first computer system of claim 14, comprising a plurality of first network interfaces, each first network interface of the plurality of first network interfaces being connected to a respective interface manager of the controller component.

17. The first computer system of claim 16, wherein the controller component includes plurality of secret keys, each associated with a respective logic block of the plurality of logic blocks for use only with that logic block.

18. The first computer system of any of claim 5, wherein the logic block is connected to the first network interface and wherein communications between the logic block and the second computer system pass from the first network interface to the logic block.

19. The first computer system of claim 18, wherein the controller component is configured to perform a cryptographic signature process by digitally signing a message using the secret key and communicating the digitally signed message to the logic block for transmission to the second computer system without sharing the secret key with the logic block.

20. The first computer system of claim 5, wherein the first computer system comprises a plurality of logic blocks and a plurality of first network interfaces, each logic block connected to a respective first network interface.

21. The first computer system of claim 20, wherein the controller component includes a plurality of secret keys, each associated with a respective logic block of the plurality of logic blocks for use only with that logic block.

22. The first computer system of claim 1, wherein the controller component includes a life-cycle manager configured to determine whether to perform operations including one or more of: power-up, power-down and reset the logic block.

23. The first computer system of claim 1, wherein the logic block is configured to boot only from boot instructions received from the controller component, wherein the logic block is configured to request boot instructions from the controller component of the first computer system on power-up or reset of the logic block, wherein the controller component is configured to communicate with the logic block and provide boot instructions to the logic block on power-up or reset of the logic block, wherein the boot instructions cannot be modified by the logic block.

24. The first computer system of claim 23, further comprising a second network interface connected to the controller component, wherein the controller component is configured to connect to a third computer system via the second network interface and receive boot instructions from the third computer system and to provide the boot instructions to the logic block, wherein the boot instructions are preferably stored in the controller and cannot be modified by software operating on the first computer system.

25. A process performed at a first computer system for establishing a connection over a network between a second computer system and a logic block of the first computer system, the process comprising:
  providing an attestation from the first computer system to the second computer system that the logic block of the first computer system has not previously established a connection over the network with any computer system since the most recent power-up or reset of the logic block.

26. The process of claim 25, wherein the establishment of the connection is initiated by the second computer system and the attestation is provided during the establishment of the connection.

27. The process of claim 25, wherein the communications channel has a cryptographic characteristic and wherein providing an attestation from the first computer system to the second computer system comprises providing a cryptographic functionality to the logic block only once after each power-up or reset of the logic block.

28. The process of claim 27, wherein providing the cryptographic functionality to the logic block once after each power-up or reset of the logic block comprises demonstrating access to a secret key associated with the logic block only once after each power-up or reset of the logic block, wherein the logic block itself does not have access to the secret key associated with the logic block and the first computer system is configured not to provide the secret key associated with the logic block to the logic block.

29. The process of claim 28, wherein providing a cryptographic functionality to the logic block comprises performing a cryptographic signing or authentication function using the secret key.

30. The process of claim 27, wherein the cryptographic characteristic of the communications channel includes a cryptographic handshake.

31. The process of claim 30, further comprising preventing the logic block from connecting to any computer system after its most recent power-up or reset until an attestation is provided.

* * * * *